UNITED STATES PATENT OFFICE.

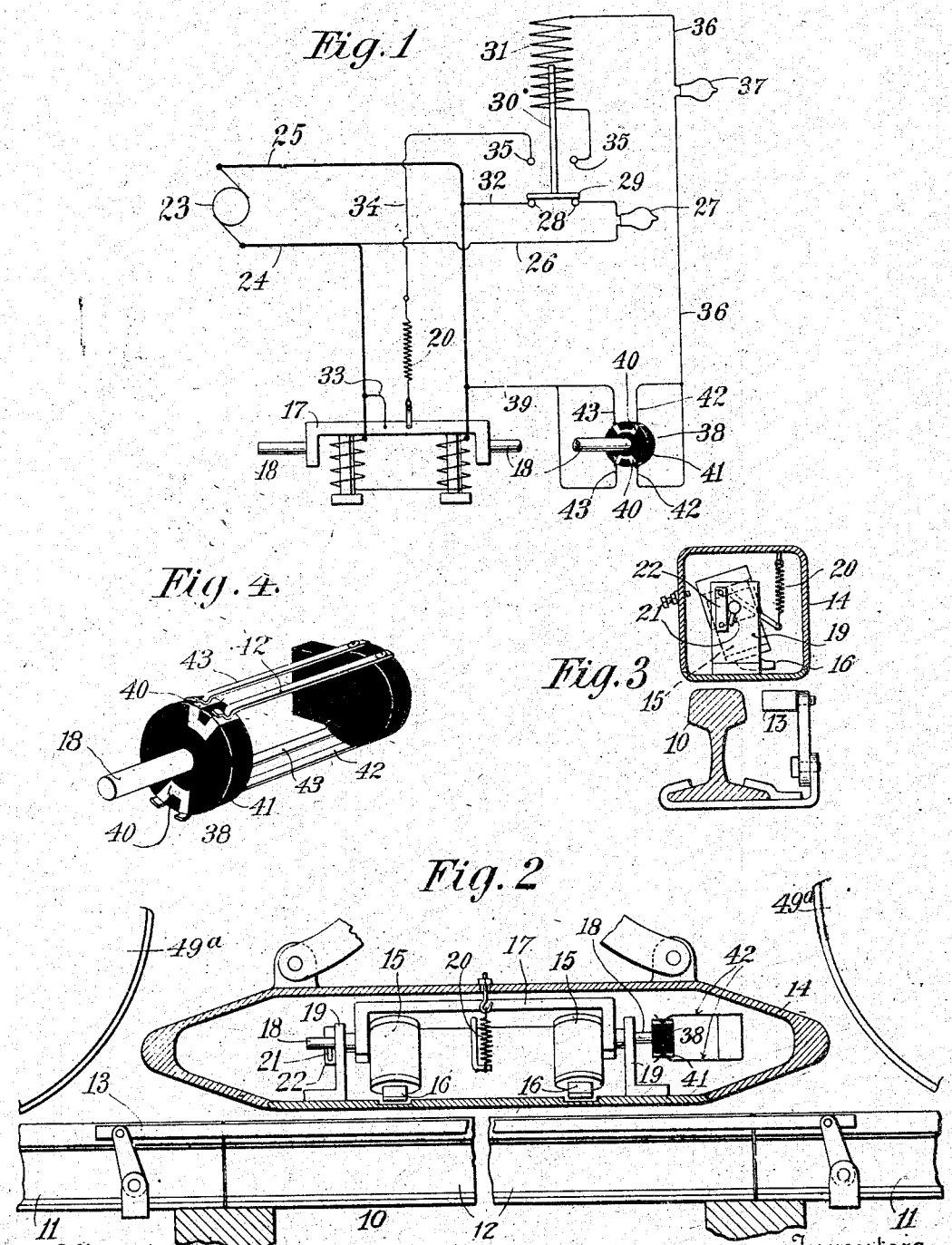

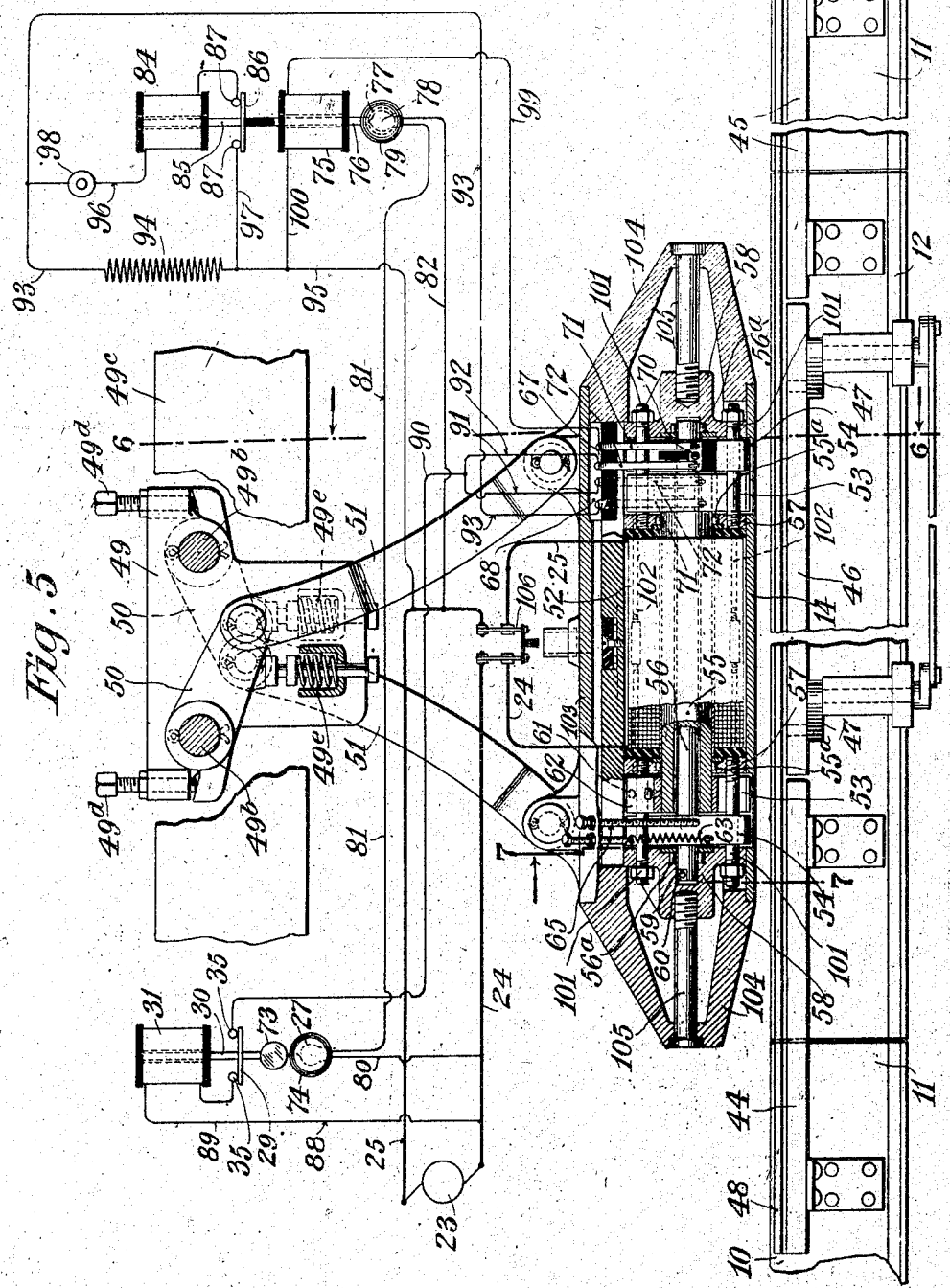

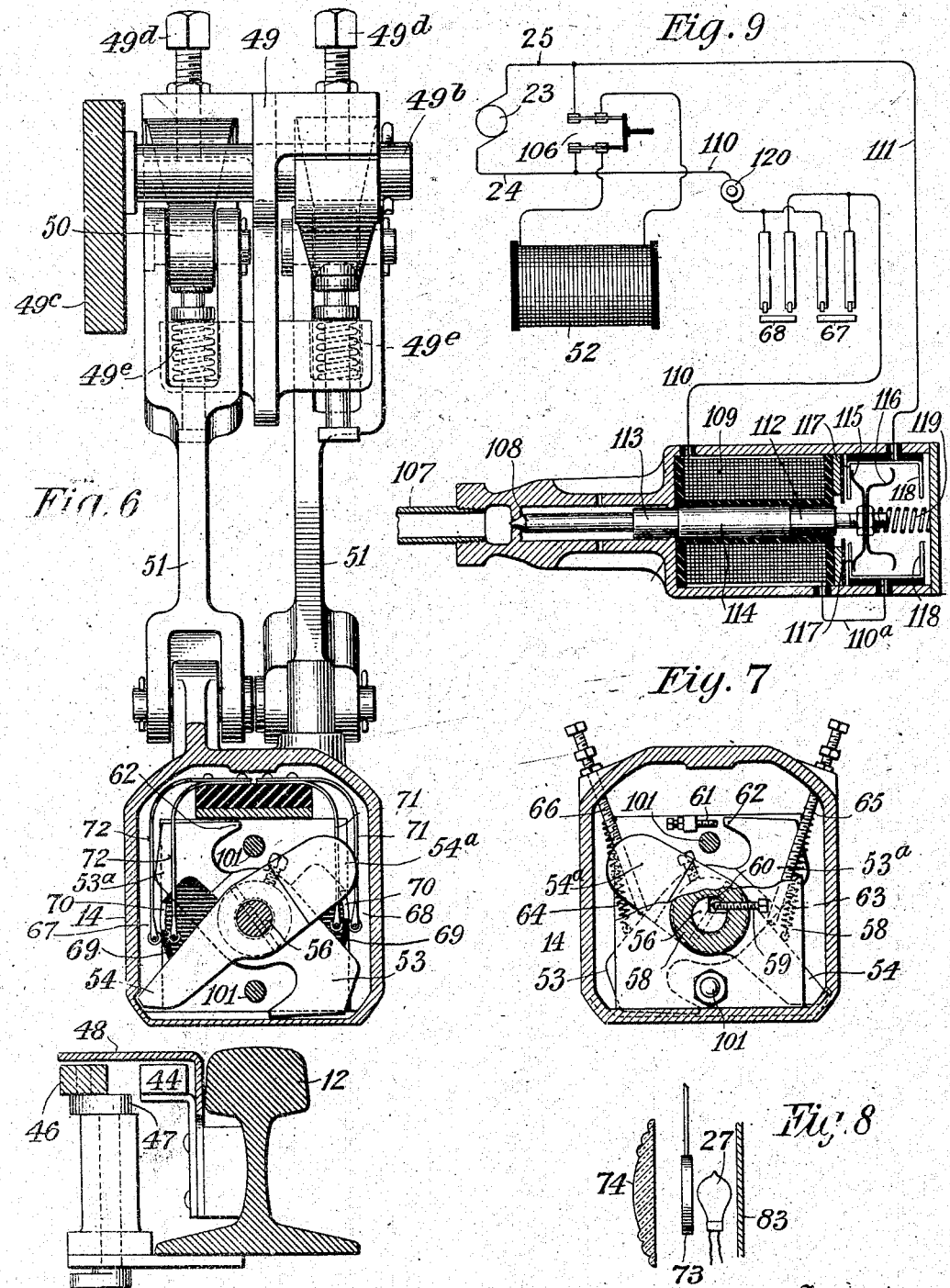

AUSTEN H. FOX, OF NEW YORK, AND ARNOLD W. LENDEROTH, OF STAPLETON, NEW YORK.

MAGNETIC DETECTOR APPARATUS FOR RAILWAYS.

1,193,773.

Specification of Letters Patent.

Patented Aug. 8, 1916.

Application filed August 8, 1912. Serial No. 713,965.

*To all whom it may concern:*

Be it known that we, AUSTEN H. FOX and ARNOLD W. LENDEROTH, citizens of the United States, residing at New York city, in the county and State of New York, and at Stapleton, in the county of Richmond and State of New York, respectively, have invented certain new and useful Improvements in Magnetic Detector Apparatus for Railways, of which the following is a specification.

This invention relates to means for controlling or giving an indication on a railway vehicle by varying the condition of the roadway, and it especially relates to apparatus of this character using magnetic communication between the vehicle and the roadway.

Our present invention may be embodied as an improvement on the apparatus described in the Fox Patent No. 1,088,814, dated March 3, 1914, and its principal objects are, first, in connection with the detector apparatus, to diminish the amount of energy required in the car magnet which coöperates with the armature rail and reduce the space occupied for a magnet of given strength, to provide a magnet-operated switch which shall be proof against vibration, to avoid heavy springs or counterweights, and to overcome the disturbing effects on the action of the magnet caused by side play or seeking of the truck; secondly, to provide means for perpetuating the indications given on a moving unit by a self-restoring car magnet, after the latter has passed a control point; thirdly, to furnish means for automatically indicating on the moving unit the passage of a control point where the signal or control apparatus is set for a clear track, where if not set for clear, a danger indication would be given; and fourthly, to provide a suitable mode of combining the last-named function and the normal danger-indicating function of the detector in a single instrumentality.

Of the accompanying drawings, Figure 1 represents a diagrammatic view of an embodiment of the invention adapted to accomplish the first and second objects above named. Fig. 2 represents a longitudinal section and elevation showing the detector and running rail. Fig. 3 represents a transverse section of said parts. Fig. 4 represents a perspective view of the detector switch. Fig. 5 represents a diagrammatic view of an embodiment of our invention adapted to accomplish all of the objects above-named. Figs. 6 and 7 are cross-sections on the lines 6—6 and 7—7 of Fig. 5. Fig. 8 is a side elevation and section showing an arrangement of parts adapted for the indicating devices. Fig. 9 represents a sectional and diagrammatic view showing an air-brake valve and controlling devices which we may employ in connection with our invention.

Referring at first to Figs. 1 to 4, 10 represents one of the running rails of a railway track of which 11, 11 are ordinary magnetic steel sections and 12 is an interposed rail section composed of a suitable non-magnetic material such as manganese-steel. 13 is a magnetic by-passing bar or rail placed alongside of the manganese-steel section 12, and adapted to be moved under the control of the signal apparatus or other outside agency into and out of a position where it will operatively influence the detector magnet. The latter is carried in a casing 14 suitably supported on the truck of the engine or other railway vehicle whose wheels are indicated at 49$^a$, and in this instance it comprises a magnet composed of two parallel diametrically-disposed spools or windings 15 mounted on cores which have magnetic pole-pieces 16 at their lower ends over the running rail, and are connected at their upper ends by a magnetic yoke 17. This magnet is mounted to turn on a longitudinal axis on trunnions 18 mounted in standards 19, the said axis passing as nearly as possible through the center of gravity of the mass so as to balance the latter against vibration, and a light spring 20 is provided for carrying the pole-pieces 16 upwardly and outwardly in a circular arc away from the running rail when the magnet reaches a magnetic gap in the latter. One of the trunnions 18 and standard 19 are provided with coöperating stop members 21, 22 to keep the pole-pieces of the magnet, when the latter are drawn down, out of contact with the bottom of casing 14, and the plane of contact of these stop members is preferably vertical so that vertical shocks will not tend to jar the magnet poles away from their lowest position.

A suitable source of current such as a dynamo 23, is mounted on the moving unit and supplies current through wires 24, 25 to the coils 15 of the detector magnet, the latter being constantly energized. Current is also tapped off from the wire 24 to pass by way of a wire 26, a danger-indicating lamp 27, a pair of stationary switch-points 28, and a bridging switch member 29 carried by the armature stem 30 of a solenoid 31, and returns through wires 32 and 25 to the dynamo. From the wire 24 another branch circuit passes by way of wires 33, 34, stationary switch contacts 35 adapted to be bridged by the contact member 29, solenoid 31, wire 36, and clear-indicating lamp 37 to a switch 38 operated by the detector magnet, and returns by way of wires 39 and 25 to the dynamo. The spring 20 is preferably included in this last-mentioned circuit, so that in case it should break or become disconnected, the fact would be disclosed by failure of the solenoid to hold up its armature or give a clear indication when said armature is manually raised while the detector switch is closed.

The office of the switch 38 is to close the circuit of the solenoid 31 when the poles of the detector magnet are attracted to the running rail 10 or by-passing bar 13, and to open said circuit when the poles are released. Said switch is constructed in duplex fashion to avoid being accidentally opened by road shocks, there being two rotary bridging contacts 40, carried by an insulating disk 41 located on one of the magnet trunnions 18, a pair of stationary yielding contact fingers or brushes 42 connected to the wire 36, and a second pair of stationary yielding contact fingers or brushes 43 connected to the wire 39, the fingers 42, 43 being adapted to be bridged by the rotary contacts 40. The two contacts of each pair being mounted on opposite sides of the insulating disk 41, it is evident that any jar which would tend to separate one fixed contact from a rotary contact 40 on which it may be resting, would also tend to increase the pressure of the other fixed contact on the other rotary contact and hence any accidental breaking of the switch circuit is avoided.

In the operation of this form of the invention, the coils 15 of the detector magnet being constantly energized by the dynamo 23, the pole-pieces of said magnet will be drawn down toward the running rail when the detector is over a magnetic section 11 of said rail. The circuit of the solenoid 31, which under these conditions is closed at the switch 38, may then be completed at the switch 35, 29 by the act of the engineer in manually raising the armature stem 30 of said solenoid, and the attraction of the solenoid for its armature will keep the solenoid circuit closed until the detector magnet loses its attraction for the running rail and opens the switch 38. This happens if the detector comes over a non-magnetic rail section 14 when the by-passing bar 13 is depressed. The spring 20 rotates the detector magnet on its trunnions until the fixed switch-points 42, 43 pass off from the bridging contacts 40, and the solenoid core then drops and closes the switch 28, 29, thus giving a danger indication by the lamp 27. As the detector magnet is self-restoring, its poles are drawn down again as soon as the detector comes over another magnetic rail section, but the danger indication will be perpetuated because the solenoid circuit has been broken and cannot be restored except by the manual act of lifting the armature stem 30. We have ascertained that a magnetic gap of twelve feet in the running rail is sufficient to give the danger indication at the highest speeds at which railway trains are ordinarily operated, but this of course may be varied more or less according to conditions. We consider it an advantage to perpetuate the indication by means other than a mechanical connection with the detector magnet, since the latter is thus allowed to be self-restoring, it can be made compact so as to be readily accommodated on a railway truck, it is the only magnet which need be carried on or connected with the truck, it will operate with a small amplitude of movement, and the magnetic gap in the running rail requisite to insure its operation is reduced to a minimum.

By pivoting the magnet to oscillate in a plane transverse to the running rail and in an up-and-down direction, and substantially balancing its mass without counterweights or heavy springs we further decrease the required size, weight and expense of said magnet for a given power, and reduce the power necessary to operate it. We also thereby avoid any considerable friction or binding effects due to the lateral magnetic flux when the detector encounters a by-passing rail or when the truck shifts laterally on the wheel journals or the rails, and further avoid the effects of any change in the vertical angle of the vehicle on a banked curve.

Referring now to Figs. 5 to 8, we have here represented a consolidated multiple detector in combination with circuit devices adapted,—in addition to the giving of a danger indication, to afford a special clear indication at the control point when the track apparatus is correspondingly set. 10 is the running rail composed as before of magnetic sections 11 interrupted by non-magnetic sections 12 at the control points. In this instance we have shown the by-passing armature structure as including two fixed sections 44, 45 which overlap the magnetic and non-magnetic sections of the running rail at the two ends of the latter, for a purpose hereinafter described, these fixed sections being interrupted by a gap adapted to be magnetically closed or opened by a movable armature section 46, the latter in this case being mounted to swing horizontally into and out of the gap on a pair of crank arms 47. 48 is a portion of a non-magnetic casing serving to cover and protect the movable bar 46. 49 is a plate carried on pins 49$^b$ on an equalizer-bar 49$^c$ of one of the wheel trucks of the vehicle for suspending the detector casing 14, the latter being supported by crank arms 50 and links 51 in such manner that it can tilt at either end and yield upwardly to an obstruction in the roadway. 49$^d$ are adjustable stops for limiting the downward movement of the casing, and 49$^e$ are springs for counteracting its weight.

The detector comprises a single horizontal coil 52 arranged lengthwise of the casing and fixed therein, the pole pieces and cores only being movable and made magnets by induction. There are two sets of pole-pieces 53, 54, the two innermost ones 53 being attached to the ends of a hollow soft-iron core 55 which passes through the coil 52, and the two outer ones 54 being attached to the ends of a soft-iron rod or core 56 which passes through the hollow core 55, the respective cores having anti-friction bearings 55$^a$, 56$^a$ in the plates or standards 57, 58. These plates or standards, between which the oscillatory pole-pieces are located, are connected by tie-rods 101, and the two plates 57, between which the coil 52 is located, are connected by other tie-rods 102. The casing 14 is composed of a tubular body 103 and two pyramidal end-pieces or heads 104 connected to the plates 58 by large single screws or bolts 105.

The respective pole-pieces 53, 54, whose upper ends are provided with non-magnetic counterweights 53$^a$, 54$^a$, slant downwardly in opposite directions so as to straddle the space above the head of the running rail, the pole-pieces 53 being principally under the influence of the inner side of said rail while the pole-pieces 54 are principally under the influence of the outer side of the running rail and the by-passing rail. Thereby the effects of lateral seeking of the truck are taken care of, because one or the other of the two sets of pole-pieces will always be attracted when over a magnetic part of the running rail. Obviously this form of detector could be substituted for the form shown in Figs. 1 to 4 for merely indicating the presence or absence of the danger condition on reaching a control point, the circuits and switches being suitably arranged so that the release of both sets of pole-pieces would be required to give the danger indication, as we will more particularly point out hereinafter in describing Fig. 9. The additional magnetic detector member or pole-pieces however, may also, as will now be pointed out in connection with Fig. 5, serve to give a positive clear indication when the track apparatus is set for clear at the control point where a danger indication would be given if the apparatus were set at danger. The additional function could be performed with an independent detector without departing from our invention, but we find that the two functions may be combined with advantage in a single instrumentality.

The two pole-pieces 53, 54 at the same end of the magnet are of like polarity, and therefore tend to repel each other or spread to diametrically opposite positions if no external armature is present below them, but when the magnetic running rail is present the flux through said rail and the pole-pieces overcomes the repulsion of the latter for each other and both pole-pieces tend to be drawn downwardly. The downward movement of the pole-pieces 54 is limited by fixed and movable stop members 59, 60 (Figs. 5 and 7), and that of the pole-pieces 53 is limited by fixed and movable stop members 61, 62, the contacting stop faces being vertical. The repulsion between the pole-pieces is sufficient to produce a danger indication by the opening of both detector switches in the manner hereinafter described, but as we also desire to have the pole-pieces act separately, it is preferred to employ light springs 63, 64 for retracting said pole-pieces, and adjustable back-stops 65, 66 to limit the retracting movement. Also these springs allow testing of the apparatus for derangement of the main energizing circuit 24, 25 of the detector coil, for if this circuit is broken and the signal circuits hereinafter described are intact, the closure of the hand switch 106 will give a danger indication where otherwise a safe indication would appear.

Figs. 6 and 7 show both sets of pole-pieces in their retracted positions, and Fig. 5 shows the pole-pieces 54 drawn down by the by-passing rail 46.

67 is a switch operated by the movement of the core 56 and pole pieces 54, and 68 is a switch operated by the movement of the core 55 and pole-pieces 53, said switches being closed when the respective pole-pieces are down, and opened when the pole-pieces are up. The two switches are of similar construction, the pole-piece having attached to it a segmental insulating disk 69 carrying a bridging contact 70 which is adapted to connect across the brushes 71, 72, each brush being in duplicate, embracing said segment on opposite sides to avoid accidental opening of the circuit by jarring.

23 represents the dynamo or source of current on the vehicle and 24, 25 are the circuit wires leading therefrom and connected to the terminals of the coil 52 so that the latter is constantly energized.

31 is a solenoid, the dropping of whose core stem 30 causes a red glass target 73 carried by said core stem to pass between a white lamp 27 and a white glass spectacle 74 so as to give the danger indication, the core stem 30 being adapted to be raised manually and then sustained in raised position by the closing of its circuit through the bridging switch contact 29 and the fixed contacts 35.

75 is a solenoid the raising of whose core stem 76 causes a green glass target 77 to pass between a white lamp 78 and a white glass spectacle 79 to give the clear indication at a control point. The two lamps 27 and 78 are in series across the mains 24, 25 through wires 80, 81, 82. Fig. 8 represents the arrangement of parts for the red signal which is also suitable for the green signal, there being preferably a white fixed surface 83 back of the lamp to show red, green or white by reflected light even if the lamps should be out.

84 is a sustaining solenoid whose core stem 85 is connected with that of the solenoid 75 and carries a bridging contact 86 co-operating with fixed contacts 87 to hold the circuit of solenoid 84 closed.

Current passes from the main 24 by way of a wire 88 to the solenoid 31 and from thence by wire 89, switch contacts 35, 29, and wire 90 to wires 91, 92 which connect the brushes 72 of the two detector switches 67, 68. For convenience the switch 68 may be termed the main switch, and switch 67 the by-pass switch. Since they are both in series with the solenoid 31 and in parallel with each other it is evident that the circuit has to be broken at both switches before the solenoid 31 will drop its target and give a danger indication. The current from brush 71 of the main switch 68 passes by way of wire 93 through a resistance 94 and thence through a return wire 95 to the main 25, and also passes in parallel through wire 96, solenoid 84, switch members 86, 87, and wire 97 to the return-wire, this branch circuit containing a push-button switch 98 which is normally closed. The resistivity of the solenoid 84 is less than that of the resistance 94. Current passes from the brush 71 of the by-pass switch 67 by way of wire 99 through the solenoid 75, and returns by wires 100 and 95. The resistivity of the solenoid 75 is greater than that of the resistance 94.

In the operation of this form of our invention it may be assumed that the detector is over a magnetic rail section 11 and the core of solenoid 31 has been manually raised to close the switch 29, 35. The pole-pieces 53 will be held down toward the rail, and the main switch 68 will thereby be held closed so that current passes through the solenoid 31 and the latter tends to hold its core and the red target 73 elevated. This current also passes through the resistance 94. If the green target 77 has previously been dropped, the circuit of solenoid 84 will be broken at the switch 86, 87. The other pole-pieces 54 may or may not be held down, depending somewhat upon the lateral seeking of the truck or the presence of external iron. When the detector reaches a control point, the pole-pieces 54 are drawn or kept down by the advance fixed section 44 of the by-passing rail, and the by-pass switch 67 is thereby held closed. This completes the branch circuit through the solenoid 75, but since the latter is of greater resistivity than the resistance 94 in parallel therewith by way of the main switch 68, the current flows principally by the latter path and the green target is not immediately raised. But as soon as the pole-pieces 53 come over the non-magnetic rail section 12 they are released and the circuit through the main switch 68 and resistance 94 is broken. Solenoid 75 will then raise or tend to raise the green target and show a clear indication. This is only momentary unless the magnetic bar 46 is moved into the air gap between 44 and 45, the duration of the impulse depending on the speed of the train and the amount of overlap which 44 has upon the non-magnetic section 12. If 46 has been moved into its operative position, the clear signal only, given by the elevation of the target 77, will show. The circuit through the solenoid 31 for the danger signal remains intact through the by-pass switch 67, and the red target 73 is not dropped. The elevation of the green target completes the circuit through the switch 86, 87 and solenoid 84, and this condition persists after the control point is passed and the circuit through the main switch 68 and resistance 94 has been restored; since the latter's resistivity is greater than that of solenoid 84. The green target may be dropped by the engineer breaking the circuit through 84 by pushing the switch 98.

The purpose of the overlapping or fixed armature section 44 is to insure that the pole-pieces 54, which might be up through side-seeking of the truck, shall be brought down before the pole-pieces 53 have been released, so that 54 shall be prepared to give a green signal if the filler 46 is in the gap. The overlapping fixed section 45 serves a similar purpose in holding closed the switch 67 until the switch 68 is closed, and thus avoiding a false danger indication.

If the movable magnetic bar 46 is out of the gap between 44 and 45 when the detector passes over the non-magnetic rail section 12, both sets of pole-pieces 53 and 54 will be released and both of the switches 67 and 68 will be opened. This breaks the circuit of solenoid 31 and the red target 73 will drop, giving a danger indication. The momentary impulse through the clear signal solenoid 75 which precedes the danger signal is not of sufficient duration to mislead the engineer if the train is going fast, and if it is going slowly or has stopped with the detector over a non-magnetic rail section but not yet over the air gap between 44 and 45, there would not be sufficient distance available in which to accelerate the train before receiving the danger indication.

The "indication" herein referred to is to be understood as including the stoppage or control of the vehicle as well as the giving of a visual or other signal. For example, in Fig. 9, 107 may represent the train-pipe of an air-brake system, and 108 an outlet-valve therefor which when open allows the train-pipe pressure to become reduced so as to apply the brakes in a well-known manner. 109 is a solenoid connected in a circuit 24, 110, 110ª, 111, 25 with the dynamo 23, which circuit also includes the two detector switches 67, 68 in parallel with each other, the opening of both switches, in a manner which will be understood from the previous description being required to deënergize the solenoid 109. The solenoid has two alined magnetic cores or armatures 112, 113, connected with each other by a non-magnetic stem 114, and connected with valve 108. 115 and 116 are two movable bridging contacts carried by the solenoid core structure, and 117, 118 are two sets of fixed contacts whose members are connected respectively to the wires 111 and 110ª. 119 is a spring to hold the valve 108 closed. When the circuit of solenoid 109 is closed by the switches 67, 68, the valve 108 is held closed by the attraction of the solenoid for core 112, and also by the spring 119 (or additionally, or instead by gravity if the solenoid is placed vertically). When a control point with an open gap in its by-passing rail is reached, the opening of the switches 67, 68 breaks the circuit of the solenoid, core 112 is released, the air-pressure forces and holds valves 108 open against the pressure of spring 119, and the switch 116, 118 will be closed. The coming again of the detector over a magnetic rail-section restores the circuit of solenoid 109 and the attraction of the latter for its core 113 holds said circuit closed at the switch 116, 118 until the engineer breaks the circuit momentarily at a push-button switch 120. This allows the core structure to return, closing the circuit again at switch 115, 117 and when the push-button switch is closed the valve will again be held closed by magnetic attraction and spring pressure. This simplified circuit arrangement could obviously be used also with a mere visual or other signal. The arrangement of air-valve, solenoid and core-connected switches shown in Fig. 9 is not herein claimed as a separate instrumentality.

We prefer in practice to equip the vehicle with a detector on each side so as to run in either direction, and may provide an automatic reversing switch such as those used in axle-lighting systems for automatically cutting out either detector according to the direction of movement of the vehicle, but for the sake of simplicity have omitted such devices from the illustration.

We claim,—

1. In a railway control or signal system, the combination of a railway having an armature in the roadway thereof, a railway vehicle, and a detector carried by said vehicle and including a magnet member pivoted to oscillate toward and from said armature, transversely of the direction of vehicle travel.

2. The combination of a running rail having magnetic and non-magnetic sections, a detector magnet carried by a railway vehicle and pivoted to oscillate in a vertical plane transverse to the line of said rail under control of the latter, and means controlled by said magnet for giving an indication on the vehicle.

3. The combination with a railway having an armature rail, of a detector carried by a vehicle above said rail and comprising a magnet member pivoted on an axis parallel to the rail passing substantially through the center of gravity of said magnet member, the latter having pole-pieces adapted to be attracted downwardly toward the rail, and a switch operated by the movement of said magnet member.

4. The combination with a railway having an armature rail, of a detector mounted to travel above said rail and comprising a gravity-balanced magnet pivoted to swing in a plane transverse to the line of travel, a spring for retracting said magnet, and a switch operated by the magnet.

5. The combination with a railway having an armature rail, of a detector mounted to travel above said rail and comprising a magnet member pivoted to swing its pole toward and from the rail, and stop members contacting in a substantially vertical plane for limiting the rail-approaching movement of said magnet member.

6. The combination with a railway having an armature rail, of a detector mounted to travel above said rail and comprising a magnet member movable by the influence of the rail, and a switch controlled by said magnet member and having duplicate switch-points oppositely responsive to shocks.

7. The combination with a railway having an armature rail, of a detector mounted to travel above said rail and comprising a magnet member movable by the influence of the rail, a circuit having a movable switch-contact on one side thereof, actuated by said magnet-member, and duplicate yielding brushes on the other side of the circuit embracing said movable contact between them and oppositely movable thereagainst.

8. The combination of a railway having a running rail composed of magnetic and non-magnetic sections, a railway vehicle, a magnet carried by the vehicle and adapted to be released by encountering a non-magnetic rail section and automatically attracted again on reaching a magnetic rail section, a circuit controlled by said magnet and having an indicating device adapted to be actuated when the magnet reaches a non-magnetic section, and means controlled by said device for retaining it in its indicating condition after the magnet has been reattracted.

9. The combination of a railway having a running rail composed of magnetic and non-magnetic sections, a railway vehicle, a detector magnet carried by the vehicle and adapted to be released by encountering a non-magnetic rail section and automatically attracted again on reaching a magnetic rail section, a circuit controlled by said magnet and having an electro-magnet, and a switch in said circuit actuated by said electro-magnet to hold the circuit closed.

10. The combination of a railway having an armature rail, and magnet members mounted to travel above said rail and coöperating with opposite sides of the latter.

11. The combination of a railway having an armature rail, and a magnet structure mounted to travel above said rail and having pivoted pole-pieces coöperating with opposite sides thereof.

12. The combination of a railway having an armature rail, a detector mounted to travel above said rail and having a fixed horizontal magnet coil parallel with the rail, and a pivotal pole-piece having a core in said coil.

13. The combination of a railway having an armature rail, and a detector mounted to travel above said rail and comprising a horizontal magnet coil, cores mounted to turn in said coil, and pole-pieces on said cores spanning the space above the rail.

14. The combination of a railway having an armature rail, a detector mounted to travel above said rail and comprising a fixed horizontal magnet coil parallel with the rail, a hollow magnetic core mounted to turn in said coil and having pole-pieces at its ends adapted to be attracted toward said core mounted to turn in said hollow core and having pole-pieces at its ends adapted to be attracted toward said rail in the opposite direction.

15. The combination of a railway magnetically differentiated at control points and having means at said points for obscuring the differentiation, a railway vehicle, magnetic devices thereon coacting with the railway, and indicating devices on the vehicle controlled by said magnetic devices and adapted to give either a clear or a danger indication at said control points and a different indication between said points.

16. The combination of a railway having a running rail composed of magnetic and non-magnetic sections, means on the roadway for magnetically by-passing a non-magnetic section, a railway vehicle, means on the vehicle for giving danger and clear indications, and magnet members on the vehicle so positioned as to be influenced by said non-magnetic section and said by-passing means respectively, and adapted to conjointly give the danger indication when the by-passing means is inoperative, and the clear indication when the by-passing means is operative.

17. The combination of a railway having a running rail composed of magnetic and non-magnetic sections, means on the roadway for magnetically by-passing a non-magnetic section, a railway vehicle, means on the vehicle for giving danger and clear indications, and magnet members on the vehicle so positioned as to be influenced by said non-magnetic section and said by-passing means respectively, and adapted to give the danger indication when both of said magnet members are released and the clear indication when one is released and the other attracted.

18. The combination of a railway having a running rail composed of magnetic and non-magnetic sections, means for magnetically by-passing a non-magnetic section, a railway vehicle, magnet members carried by said vehicle and adapted to be attracted respectively by the magnetic sections of the running rail and the by-passing means, switches closed by the attraction of said members, a danger-indicating device carried by the vehicle and adapted to be operated by the opening of both of said switches, and a clear-indicating device carried by the vehicle and adapted to be operated by the closing of the switch controlled by the by-passing means while the other switch is opened.

19. The combination of a railway having a running rail composed of magnetic and non-magnetic sections, means for magnetically by-passing a non-magnetic section, a railway vehicle, a detector carried by the ing independently movable pivoted pole-pieces, one of which is influenced by the magnetic sections of the running rail and the other of which is influenced by the by-passing means, a danger-indicating device adapted to be actuated when both of said pole-pieces are released, and a clear-indicating device adapted to be actuated when the pole-piece controlled by the by-passing means is attracted and the other released.

20. The combination of a railway having a roadway armature, a vehicle on said railway, and a detector carried by said vehicle and comprising two magnet members of like polarity in repulsive relation to each other, adapted to be attracted by said armature.

21. The combination of a railway having a roadway armature, a vehicle on said railway, and a detector carried by the vehicle and comprising a stationary magnet coil and two cores mounted to turn therein and having pole-pieces of like polarity in repulsive relation to each other, adapted to be attracted toward said armature against the force of their repulsion.

22. The combination of a railway having a roadway armature, and a detector mounted to travel over said armature and comprising a magnet structure having independently-movable pole-pieces of like polarity in repulsive relation and adapted to be attracted by said armature, spring means for yieldingly retracting said pole-pieces, and adjustable stops for limiting their retractive movement.

23. The combination of a railway having a roadway armature structure, a vehicle on said railway, two magnet members on the vehicle coöperating with said armature structure, switches operated by said magnet members, a danger-indicating electro-magnet on the vehicle, whose circuit is controlled in parallel by both of said switches, and a clear-indicating electro-magnet on the vehicle in series with one of the switches and with the first-said electro-magnet.

24. The combination of a railway having a roadway armature, a vehicle on said railway, parallel circuits on said vehicle having different resistances and including clear and danger indicating electro-magnets, and magnetic detector devices on the vehicle, coöperating with said roadway armature and controlling said circuits.

25. The combination of a railway having a roadway armature structure, a vehicle on said railway, two magnet members on the vehicle, switches adapted to be closed by the attraction of said magnet members toward the armature structure, a danger-indicating electro-magnet on the vehicle whose circuit is controlled in parallel by both of said switches, a clear-indicating electro-magnet on the vehicle in series with one of the switches and with the said danger-indicating electro-magnet, and a resistance of less resistivity than said clear-indicating electro-magnet connected in shunt with the latter, and in series with the danger-indicating electro-magnet.

26. The combination of a railway having roadway armature devices, a vehicle on said railway, danger and clear indicators on said vehicle having operating electro-magnets, an electro-magnet on the vehicle for holding the clear-indicator in operative position, a switch operated by the last-said electro-magnet and controlling its circuit, and detector magnet members carried by the vehicle and responsive to said roadway armature devices for controlling the circuits of said electro-magnets.

27. The combination of a railway having roadway armature devices, a vehicle on said railway, detector magnet members carried by the vehicle, switches closed by the attraction of said magnet members toward the roadway armature devices, a danger-indicating electro-magnet carried by the vehicle and controlled in parallel by both of said switches, a clear-indicating electro-magnet on the vehicle in series with said danger-indicating electro-magnet and with one of said switches, an electro-magnet on the vehicle for retaining the clear indication, and a resistance whose resistivity is less than that of said clear-indicating electro-magnet and greater than that of said retaining electro-magnet, connected in shunt with the two last-said electro-magnets and in series with the danger-indicating electro-magnet.

28. A railway having a running rail comprising magnetic sections and an interposed non-magnetic section, a fixed magnetic bar overlapping said non-magnetic section and an adjacent magnetic section, a movable magnetic bar alongside of said non-magnetic section, a vehicle on said railway, a detector magnet carried by the vehicle and adapted to be attracted by said magnetic sections and released by said non-magnetic section, a second detector magnet carried by the vehicle and adapted to be attracted by said bars and released when the movable bar is inoperative, and devices on the vehicle controlled by said detector magnets for giving danger and clear indications.

29. The combination of a railway having a roadway-armature structure and a series of non-magnetic sections at control points, a vehicle on said railway, a plurality of magnetic detectors carried by the vehicle and capable of separate and conjoint action, and an indicating device carried by the vehicle and operated by the coincident release of said detectors at a control point, but not by the separate release of either detector.

30. The combination of a railway having a magnetic running rail interrupted by non-magnetic sections, a vehicle on said railway, an indicating device carried by the vehicle, a plurality of detector magnets carried by the vehicle, and electrical switches closed by the attraction of said magnets for the running rail, the opening of both of said switches being required to actuate said indicating device.

In testimony whereof we have hereunto set our hands in the presence of two subscribing witnesses, this 6th day of August, 1912.

AUSTEN H. FOX.
ARNOLD W. LENDEROTH.

Witnesses:
R. M. PIERSON,
EDWARD E. BLACK.